(12) United States Patent
MacKay

(10) Patent No.: US 6,926,474 B1
(45) Date of Patent: Aug. 9, 2005

(54) DISASSEMBLABLE DRILL GUIDE FOR USE IN DRILLING ANGULATED HOLES

(76) Inventor: Dana John MacKay, 3857 Birch St. #496, Newport Beach, CA (US) 92660

( * ) Notice: Subject to any disclaimer, the term of this patent is extended or adjusted under 35 U.S.C. 154(b) by 254 days.

(21) Appl. No.: 10/353,627

(22) Filed: Jan. 28, 2003

Related U.S. Application Data

(60) Provisional application No. 60/351,406, filed on Jan. 28, 2002.

(51) Int. Cl.[7] .............................................. B23B 49/02
(52) U.S. Cl. ................................ 408/115 R; 408/241 B
(58) Field of Search ................................ 408/72 R, 95, 408/97, 115 R, 241 B; 206/419, 420, 561; 229/120.26, 120.28, 120.29, 120.38, 120.35

(56) References Cited

U.S. PATENT DOCUMENTS

| | | | |
|---|---|---|---|
| 724,384 A * | 3/1903 | Ferres .......................... 206/422 |
| 2,338,530 A | 4/1944 | Ognibene | |
| 2,967,552 A * | 1/1961 | Randolph ................. 144/24.19 |
| 3,534,639 A | 10/1970 | Treichler | |
| 3,626,513 A | 12/1971 | Fytiak | |
| 3,921,891 A * | 11/1975 | Gorham ................. 229/120.26 |
| 4,132,496 A | 1/1979 | Casto | |
| 4,391,558 A | 7/1983 | Perry | |
| 4,842,453 A | 6/1989 | Raines et al. | |
| 4,934,589 A * | 6/1990 | Stephenson et al. ... 229/120.28 |
| 5,379,945 A * | 1/1995 | Kataoka ................. 229/120.26 |
| 5,518,171 A * | 5/1996 | Moss ...................... 229/120.36 |
| 5,597,113 A * | 1/1997 | Bradford ............... 229/120.36 |
| 5,626,284 A * | 5/1997 | Franzen ................. 229/120.36 |
| 5,732,876 A * | 3/1998 | Bradford ............... 229/120.07 |
| 5,788,146 A * | 8/1998 | Bradford et al. ....... 229/120.07 |
| 6,293,459 B1 * | 9/2001 | Burch, Jr. .............. 229/120.23 |
| 6,669,082 B1 * | 12/2003 | Meyer ................... 229/120.36 |
| 2004/0146366 A1 * | 7/2004 | Holcomb ..................... 408/68 |

* cited by examiner

Primary Examiner—Derris H. Banks
Assistant Examiner—Ali Abdelwahed
(74) Attorney, Agent, or Firm—Edward A. Sokolski

(57) ABSTRACT

A central piece of a drill guide is formed by a pair of opposing boards having elongated slots formed therein. A second pair of boards similar to the first set also has elongated angulated slots formed therein. The slots of the two boards are fitted into each other to form a rectangular angulated channel there between. This channel provides a guide for angulated drilling of a work piece. A board forming a foot piece is removably fitted onto the boards to form a foot rest for holding the guide in position while drilling.

9 Claims, 3 Drawing Sheets

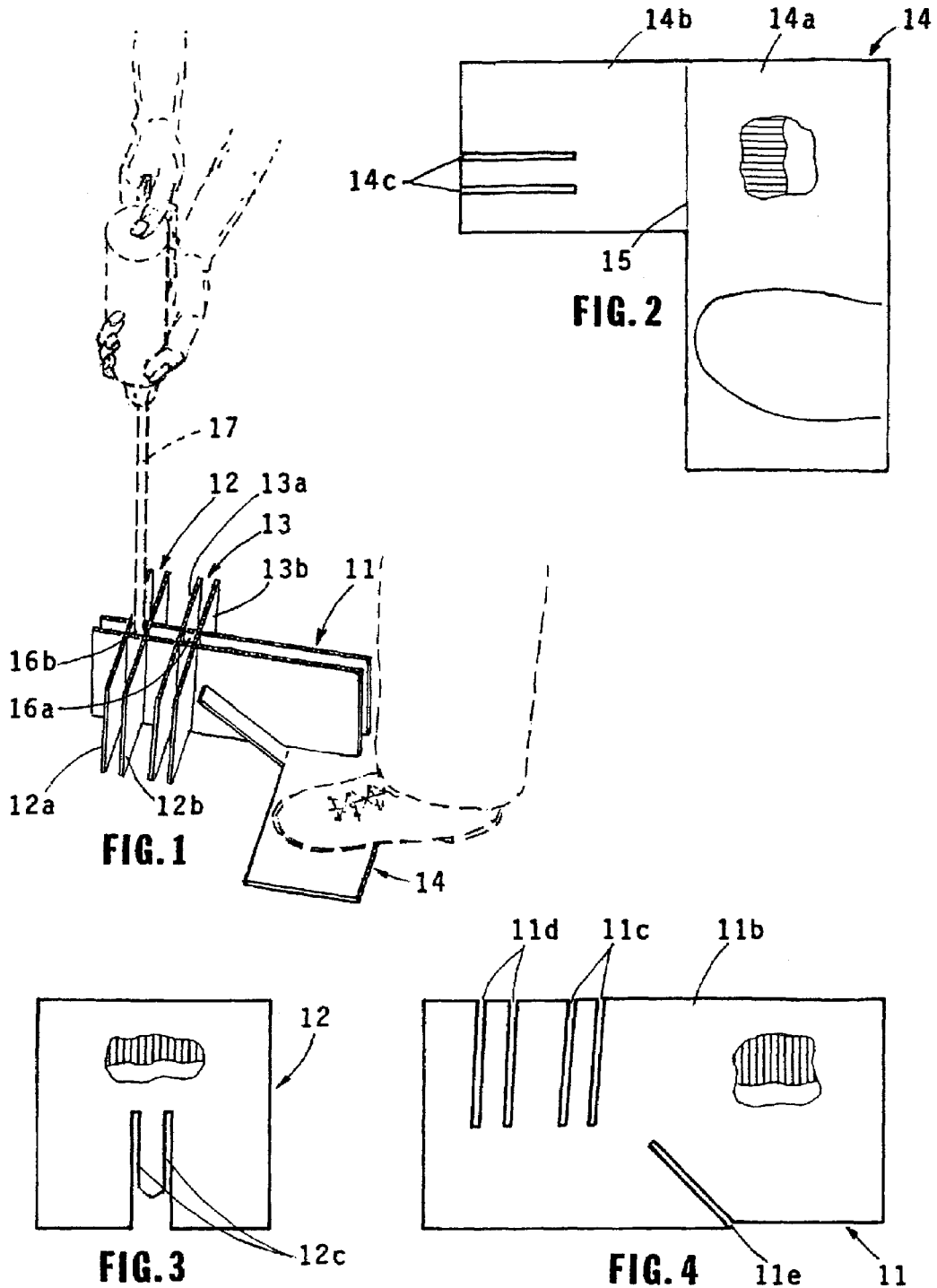

DISASSEMBLABLE DRILL GUIDE FOR USE IN DRILLING ANGULATED HOLES

This application is based on Provisional app. No. 60/351,406 filed Jan. 28, 2002.

BACKGROUND OF THE INVENTION

1. Field of the Invention

This invention relates to guides for guiding the angular drilling direction of drills and more particularly to such a device which can be readily assembled and disassembled.

2. Description of the Related Art

In the drilling of holes for supporting posts and other work pieces precisely angulated holes in the work piece are often needed to meet the application requirements. Having properly angulated holes is particularly important in the drilling of holes for supporting a series of posts on which a fence is mounted.

Various devices are described in he prior art for achieving this end result such as described in U.S. Pat. No. 4,842,453 issued Jun. 27, 1989 to Raines, et al. and U.S. Pat. No. 3,626,513 issued Dec. 7, 1971 to Pytlak. These prior art devices are either over complicated or expensive or do not have the compactness as the device of the present invention, particularly when it is folded up for stowage.

SUMMARY OF THE INVENTION

The device of the present invention provides a significant improvement over the prior art by virtue of its simplicity and economical construction while providing an accurate and reliable guide for drilling angular holes. Further, the device of the present invention is adapted to be rapidly disassembled and folded into a compact package for stowage.

The above indicated features are achieved in the present invention by fabricating the device from boards which may be of cardboard or plastic. The device includes a central piece fabricated from a pair of similar boards positioned in an opposing relationship. These boards each have a pair of parallel elongated slots which run from the top edges of the boards at a predetermined desired angle relative to the vertical. A second pair of boards which are similar to each other have elongated slots running parallel to each other from the bottom edges thereof. The slots of the second pair of boards are each removably fitted into one of the slots of the first pair of boards to form cross pieces so that the two pairs of boards are retained together.

A rectangular channel is formed between the boards, the walls formed by the second pair of boards being angulated at the predetermined drilling angle so as to provide a guide for the drill. A foot piece for use by the operator to hold the device in place with his foot is formed by a board having a flat piece on which one's foot can be rested and a angulated extension which has angulated slots which fit into angulated slots running downwardly in each of the first pair of boards to the edges of these boards. The elements forming the device can readily be removed from each other when not in use and folded over into a compact package for stowage.

It is therefore an object of this invention to provide a simple and economical drill guide for use in drilling angled holes.

It is a further object of this invention to provide a drilling guide for use in drilling angular holes which can readily be disassembled and folded over into a compact package for stowage.

Other objects of the invention will become apparent in view of the following description taken in connection with the accompanying drawings.

DESCRIPTION OF THE DRAWINGS

FIG. 1 is a top perspective view of a first embodiment of the invention shown in use for drilling a hole;

FIG. 2 is a side elevational view showing the foot piece of the embodiment of FIG. 1 disassembled from the device;

FIG. 3 is a side elevational view of a cross piece of the first embodiment;

FIG. 4 is a side elevational view of the central piece of the first embodiment;

DETAILED DESCRIPTION OF THE INVENTION

Figure 5:
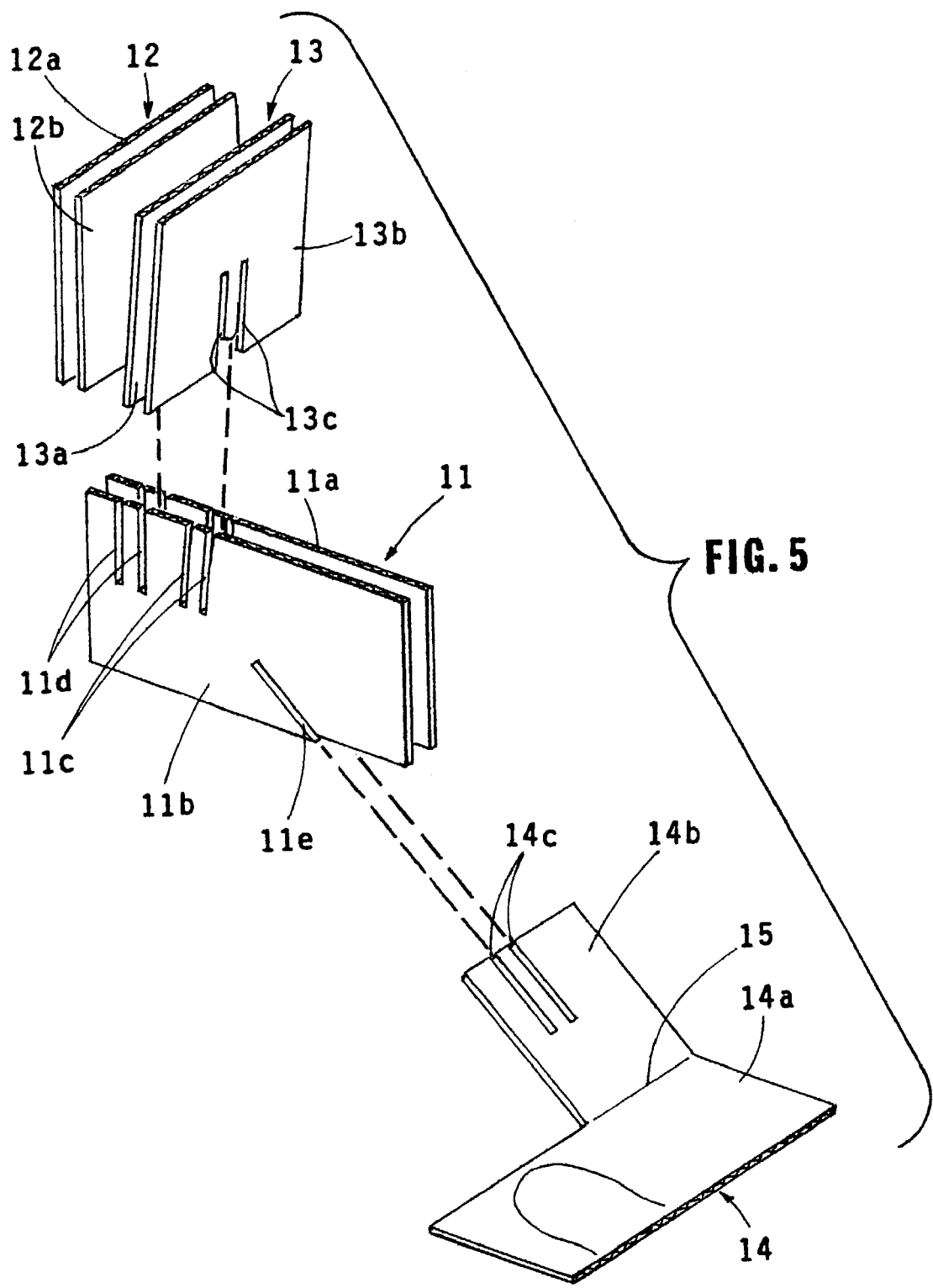
FIG. 5 is an exploded view of the first embodiment of the invention.

It is to be noted that the while the device of the invention is shown in the drawings as being fabricated of heavy cardboard, it could also be made of plastic or other material.

Referring now to FIGS. 1–5, a first embodiment of the invention is illustrated. Central piece 11 is formed from a pair of opposing boards 11*a* and 11*b* which have elongated angulated slots 11*c* and 11*d* formed therein, these slots running from the top edges of the boards to a point just past the center of the boards. Slots 11*c* and 11*d* are formed at different angles relative to the vertical. The second pair of boards provides for a different drilling angle. Angulated slots 11*e* which run from the bottom edges of each of the boards 11*a* and 11*b* are provided to receive the slotted portions 14*c* of the angulated extension 14*b* of foot piece 14.

Second pairs of boards 12 and 13 form cross pieces having opposing parallel board sections 12*a*, 12*b* and 13*a*, 13*b*. Slots 12*c* and 13*c* which are formed in the board sections extend from the bottom edges thereof.

Foot piece 14 has a flat base potion 14*a* and an angled extension portion 14*b* which has elongated slots 14*c* running from the upper edge thereof. When fabricated of cardboard, the extension is creased, as indicated by line 15, so that it may folded flat for stowage.

The device is assembled and disassembled as illustrated in FIG. 5. Slots 14*c* of foot piece 14 are removably fitted into slots 11*e* of central piece 11. Slots 12*c* and 13*c* are fitted into slots 11*d* and 11*c*, of central boards 11 respectively. Thus, it can be seen that the device can readily be assembled and disassembled.

The device is used as follows: As shown in FIG. 1, the user's foot is placed on foot piece 14 to hold the device in a steady position for drilling. One of the channels 16*a* or 16*b* (in the illustration, channel 16*b*) is placed over the spot where the hole is to be drilled. The drilling is then performed with the channel guiding the drill. The angle of channel 16*a* is made different from that of channel 16*b* to enable the drilling of holes at different angles. This is useful, for example, where a rectangular fence is supported on poles fitted into the holes drilled; the holes between the corners required to be angulated differently from those at the corners to provide tension on the top portion of the fence. If required, additional cross pieces can be added to provide additional different drilling angles.

Figure 6:
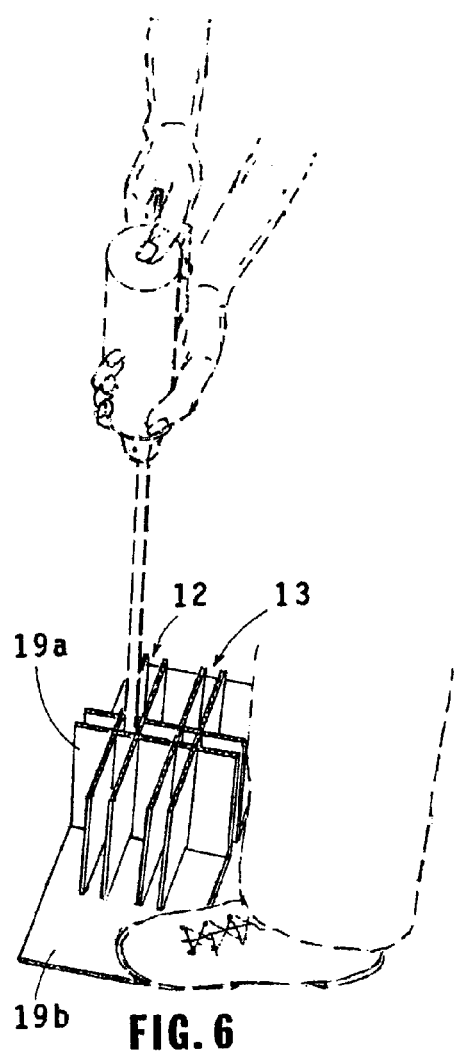
FIG. 6 is a top perspective view of a second embodiment of the invention shown in use for drilling a hole.
Figure 7:
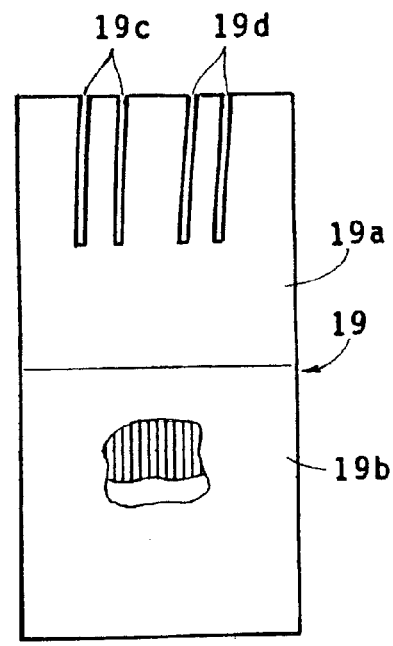
FIG. 7 is a side elevational view of one of the foot pieces of the second embodiment.
Figure 8:
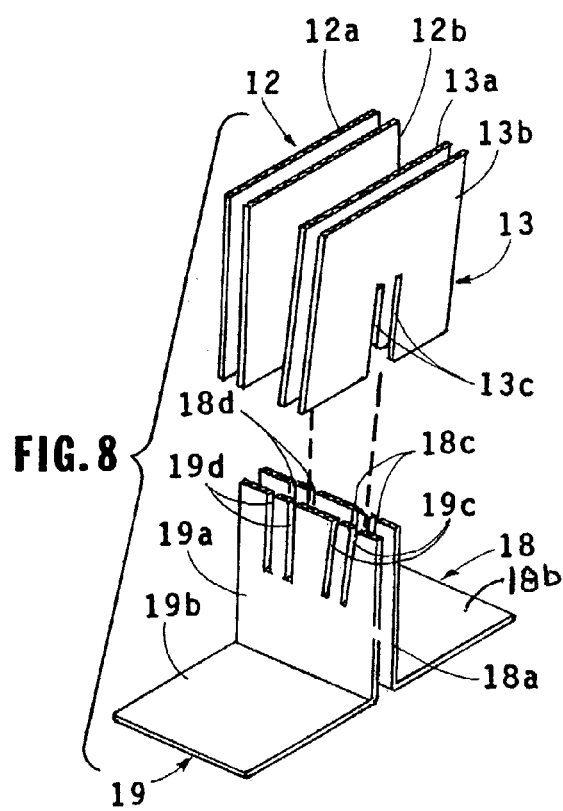
FIG. 8 is an exploded view of the second embodiment of the invention.

Referring to FIGS. 6–8, a second embodiment of the invention is illustrated. The second embodiment is simpler in construction than the first embodiment but operates in the same general manner. In this embodiment foot pieces 18 and 19 are formed by foot portions 18b and 19b and the central portion is formed by upwardly extending pieces 18a and 19a which extend at right angles from the foot portions. Slots 18c, 18d, 19c, and 19d. The slots are angled in the same manner as for the first embodiment. Boards 12 and 13 are similar to the corresponding boards of the first embodiment and the units are joined together with the corresponding slots fitted within each other as in the first embodiment. The second embodiment is shown in use in FIG. 6.

The device of the present invention thus provides a simpler and economical drilling guide for drilling angular holes which can readily be assembled and disassembled.

While the device of the invention has be described and illustrated in detail this is not intended by way of limitation, the scope and coverage of this patent being limited only by the terms of the following claims.

I claim:

1. A drill guide for guiding a drill along a predetermined drilling path which is angulated relative to the vertical comprising:
   a central piece formed by a first pair of similar opposing boards separated from each other; and
   a cross piece formed by a second pair of similar opposing boards separated from each other;
   said boards being removably joined together with said second pair of boards being angulated at an acute angle relative to the longitudinal axes of said first pair of boards;
   a channel being formed between said central and cross pieces, said channel having opposing walls formed by the walls of the boards of said cross piece which are angulated relative to the vertical along said predetermined drilling path.

2. The drill of claim 1 and further including a foot piece attached to one of said pieces for use by a user to hold the drill guide in a position while drilling.

3. The drill guide of claim 2 wherein said foot piece includes a flat portion on which the user's foot is rested and an angulated extension portion which extends from said flat portion and is removably joined to the central piece.

4. The drill guide of claim 2 wherein said foot piece comprises a flat board extending from he bottom of said central piece on which the user's foot can rest to hold the guide in position.

5. The drill guide of claim 1 wherein said central piece and said cross piece are removably joined together by a pair of slots formed in said central piece which are angulated relative to the vertical along said predetermined drilling path, and a pair of vertical slots formed in said cross piece which are fitted into the slots of said central piece.

6. The drill guide of claim 3 wherein said central piece has similar angulated slots formed in each of the boards thereof, the angulated extension portion of said foot piece having a pair of slots formed therein which are filled within the angulated slots of said central piece boards.

7. A drill guide for guiding a drill along a predetermined drilling path angulated relative to the vertical comprising:
   a central piece formed by a first pair of similar opposing boards which are separated from each other, each of said boards having a pair of elongated slots formed therein, said slots running parallel to each other from the top edges of said boards at a predetermined angle relative to the vertical axes of said boards, said predetermined angle corresponding with said angulated drilling path,
   a cross piece formed by a second pair of similar opposing boards which are separated from each other, each of said boards having elongated slots running parallel to each other from the bottom edges of said second pair of boards,
   the slots of said second pair of boards each being fitted into a separate one of the slots of said first pair of boards such that the two pairs of boards are removably retained together to form a rectangular channel there between, a pair of opposing walls formed by the walls of the boards of said central piece being angulated in accordance with the predetermined drilling path, and
   a foot piece removably attached to said central piece for enabling retention of said guide in a fixed position while drilling.

8. The drill guide of claim 7 wherein said foot piece comprises a flat portion on which a user's foot can rest and an elongated portion extending from said flat portion, the boards of said central piece having a second pair of angulated slots formed therein, the angulated portion of said foot piece being angulated at substantially the same angle as said second pair or angulated slots of said central piece, said angulated portion of said foot piece having a pair of slots which are fitted into the second pair of slots of said central piece.

9. The drill guide of claim 7 wherein said foot piece comprises a flat portion extending at right angles from the bottom of said central piece, said flat portion forming a foot rest for use in holed the guide in position while drilling.

* * * * *